(12) United States Patent
Zhang et al.

(10) Patent No.: US 12,147,687 B2
(45) Date of Patent: Nov. 19, 2024

(54) SYSTEM AND METHOD FOR DYNAMIC CLOUD-BASED STORAGE SYSTEM DEPLOYMENT

(71) Applicant: Dell Products, L.P., Round Rock, TX (US)

(72) Inventors: Phil (Jingliang) Zhang, Shanghai (CN); Dmitry Krivenok, The Gallops (IE); Felix Li, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 75 days.

(21) Appl. No.: 18/177,873

(22) Filed: Mar. 3, 2023

(65) Prior Publication Data
US 2024/0211148 A1    Jun. 27, 2024

(30) Foreign Application Priority Data
Dec. 27, 2022    (CN) .......................... 202211687745.0

(51) Int. Cl.
*G06F 12/00*    (2006.01)
*G06F 3/06*    (2006.01)

(52) U.S. Cl.
CPC .......... *G06F 3/0629* (2013.01); *G06F 3/0613* (2013.01); *G06F 3/067* (2013.01)

(58) Field of Classification Search
CPC ...... G06F 3/0629; G06F 3/0613; G06F 3/067; H04L 45/745; H04L 45/7457; H04L 47/78; H04L 49/351
See application file for complete search history.

(56) References Cited

U.S. PATENT DOCUMENTS

2020/0259705 A1 *   8/2020   Mercier ................ H04W 8/005

* cited by examiner

*Primary Examiner* — Shawn X Gu
(74) *Attorney, Agent, or Firm* — Brian J. Colandreo; Heath M. Sargeant; Holland & Knight LLP

(57) ABSTRACT

A method, computer program product, and computing system for determining whether an availability zone of a plurality of availability zones is routable to an on-premises network. An intent associated with the deployment of a cloud-based storage system is processed. The cloud-based storage system is deployed in the availability zone based upon, at least in part, whether the availability zone is routable to an on-premises network and the intent associated with the deployment of the cloud-based storage system.

20 Claims, 8 Drawing Sheets

SYSTEM AND METHOD FOR DYNAMIC CLOUD-BASED STORAGE SYSTEM DEPLOYMENT

RELATED APPLICATION(S)

This application claims priority from Chinese Patent Application No. 202211687745.0, filed on 27 Dec. 2022 at the State Intellectual Property Office, titled "System and Method for Dynamic Cloud-based Storage System Deployment", the entire contents of which is incorporated herein by reference.

BACKGROUND

Storing and safeguarding electronic content may be beneficial in modern business and elsewhere. Accordingly, various methodologies may be employed to protect and distribute such electronic content.

Storage of electronic content may be deployed in a cloud computing environment. A cloud computing environment is a technological environment that provides cloud-based computing services over a set of hosted servers and applications which are accessible over the internet or other network configuration. Examples of cloud-based computing services include applications and development platforms, to servers, storage, and virtual computing systems. Cloud-based computing services are provided by cloud computing providers (service providers) as a service over the internet. Their services include servers, virtual machines, applications, application development platforms, storage, databases, and/or networking. Users (individuals or companies) can subscribe to cloud computing services with varying pricing options to choose from. Modern computing solutions are built on top of cloud native technologies such as cloud compute, storage, networking, security, etc. and are deployed in many different configurations (e.g., single cloud, multi-cloud, single-availability zone, multi-availability zone, multi-region, cloud-only, hybrid with on-premises). Before these solutions are available to the customers, they need to be developed and tested in the public cloud and hybrid environments.

As such, developers need to develop software-defined applications or systems that require cloud infrastructure which is connected to the on-premises infrastructure via a secure network. The application/system requires a set of cloud resources, some of which are pre-provisioned, and some are provisioned dynamically. Conventional approaches provision brand-new cloud infrastructure environment assumes that the entire infrastructure is created from scratch and removed when no longer needed. As such, these approaches are often impractical in large hybrid environments when networking and/or security are managed by separate teams. Additionally, conventional approaches are developer-unfriendly because all low-level details of the cloud infrastructure proliferate to the developer's workflow and the selection is manual. As such, it is not reliable because application deployment will fail if the manually selected subnet does not have enough network (IP) addresses, if the selected availability zone does not have enough capacity for the selected instance type, and so on.

SUMMARY OF DISCLOSURE

In one example implementation, a computer-implemented method executed on a computing device may include, but is not limited to, determining whether an availability zone of a plurality of availability zones is routable to an on-premises network. An intent associated with the deployment of a cloud-based storage system is processed. The cloud-based storage system is deployed in the availability zone based upon, at least in part, whether the availability zone is routable to an on-premises network and the intent associated with the deployment of the cloud-based storage system.

One or more of the following example features may be included. Determining whether an availability zone of the plurality of availability zones is routable to an on-premises network may include: sorting a plurality of subnets in a first set of availability zones routable to the on-premises network by order of available network addresses from a plurality of network addresses of the first set of availability zones; and sorting a plurality of subnets in a second set of availability zones non-routable to the on-premises network by order of available network addresses from a plurality of network addresses of the second set of availability zones. Processing the intent associated with the deployment of a cloud-based storage system may include receiving a selection of the intent from a plurality of intents. The plurality of intents may include one or more of: a first intent configured to deploy a minimum set of resources in an availability zone; a second intent configured to deploy a set of resources for optimizing IO operations in an availability zone; a third intent configured to deploy a set of resources for data mobility in a cloud computing environment; and a fourth intent configured to deploy a set of resources for data mobility between the cloud computing environment and the on-premises network. Deploying the cloud-based storage system in the availability zone based upon, at least in part, whether the availability zone is routable to an on-premises network and the intent associated with the deployment of the cloud-based storage system may include using a first subnet from the first set of availability zones that are routable to the on-premises network. Deploying the cloud-based storage system in the availability zone based upon, at least in part, whether the availability zone is routable to an on-premises network and the intent associated with the deployment of the cloud-based storage system may include using a first subnet from the second set of availability zones that are non-routable to the on-premises network. One or more error handling operations may be performed during deployment of the availability zone.

In another example implementation, a computer program product resides on a computer readable medium that has a plurality of instructions stored on it. When executed by a processor, the instructions cause the processor to perform operations that may include, but are not limited to, determining whether an availability zone of a plurality of availability zones is routable to an on-premises network. An intent associated with the deployment of a cloud-based storage system is processed. The cloud-based storage system is deployed in the availability zone based upon, at least in part, whether the availability zone is routable to an on-premises network and the intent associated with the deployment of the cloud-based storage system.

One or more of the following example features may be included. Determining whether an availability zone of the plurality of availability zones is routable to an on-premises network may include: sorting a plurality of subnets in a first set of availability zones routable to the on-premises network by order of available network addresses from a plurality of network addresses of the first set of availability zones; and sorting a plurality of subnets in a second set of availability zones non-routable to the on-premises network by order of available network addresses from a plurality of network addresses of the second set of availability zones. Processing the intent associated with the deployment of a cloud-based storage system may include receiving a selection of the intent from a plurality of intents. The plurality of intents may include one or more of: a first intent configured to deploy a minimum set of resources in an availability zone; a second intent configured to deploy a set of resources for optimizing IO operations in an availability zone; a third intent configured to deploy a set of resources for data mobility in a cloud computing environment; and a fourth intent configured to deploy a set of resources for data mobility between the cloud computing environment and the on-premises network. Deploying the cloud-based storage system in the availability zone based upon, at least in part, whether the availability zone is routable to an on-premises network and the intent associated with the deployment of the cloud-based storage system may include using a first subnet from the first set of availability zones that are routable to the on-premises network. Deploying the cloud-based storage system in the availability zone based upon, at least in part, whether the availability zone is routable to an on-premises network and the intent associated with the deployment of the cloud-based storage system may include using a first subnet from the second set of availability zones that are non-routable to the on-premises network. One or more error handling operations may be performed during deployment of the availability zone. In another example implementation, a computing system includes at least one processor and at least one memory architecture coupled with the at least one processor, wherein the at least one processor configured to determine whether an availability zone of a plurality of availability zones is routable to an on-premises network. An intent associated with the deployment of a cloud-based storage system is processed. The cloud-based storage system is deployed in the availability zone based upon, at least in part, whether the availability zone is routable to an on-premises network and the intent associated with the deployment of the cloud-based storage system.

One or more of the following example features may be included. Determining whether an availability zone of the plurality of availability zones is routable to an on-premises network may include: sorting a plurality of subnets in a first set of availability zones routable to the on-premises network by order of available network addresses from a plurality of network addresses of the first set of availability zones; and sorting a plurality of subnets in a second set of availability zones non-routable to the on-premises network by order of available network addresses from a plurality of network addresses of the second set of availability zones. Processing the intent associated with the deployment of a cloud-based storage system may include receiving a selection of the intent from a plurality of intents. The plurality of intents may include one or more of: a first intent configured to deploy a minimum set of resources in an availability zone; a second intent configured to deploy a set of resources for optimizing IO operations in an availability zone; a third intent configured to deploy a set of resources for data mobility in a cloud computing environment; and a fourth intent configured to deploy a set of resources for data mobility between the cloud computing environment and the on-premises network. Deploying the cloud-based storage system in the availability zone based upon, at least in part, whether the availability zone is routable to an on-premises network and the intent associated with the deployment of the cloud-based storage system may include using a first subnet from the first set of availability zones that are routable to the on-premises network. Deploying the cloud-based storage system in the availability zone based upon, at least in part, whether the availability zone is routable to an on-premises network and the intent associated with the deployment of the cloud-based storage system may include using a first subnet from the second set of availability zones that are non-routable to the on-premises network. One or more error handling operations may be performed during deployment of the availability zone.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
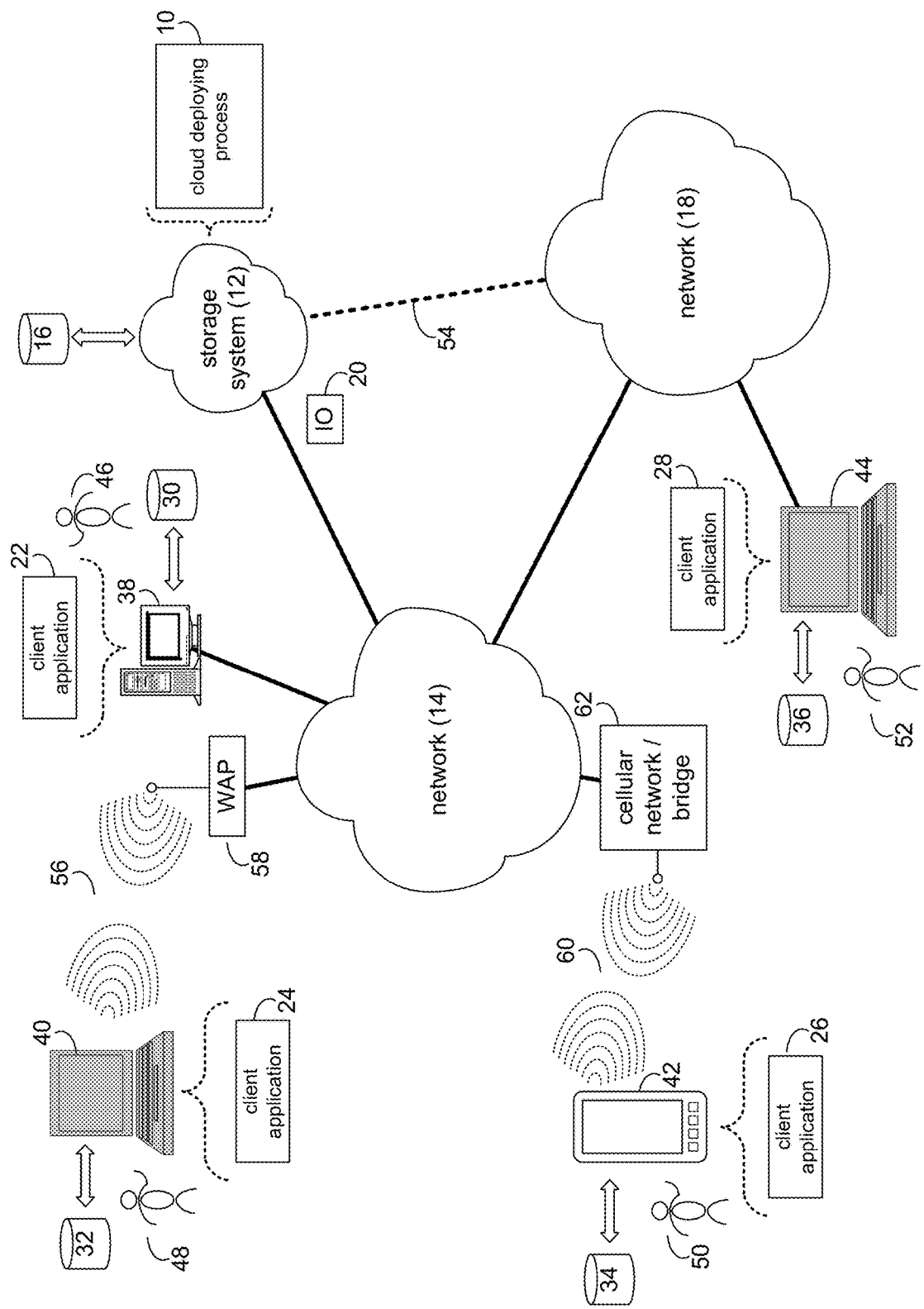
FIG. 1 is an example diagrammatic view of a storage system and a cloud deployment process coupled to a distributed computing network according to one or more example implementations of the disclosure.

System Overview:

Referring to FIG. 1, there is shown cloud deployment process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of cloud deployment process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of cloud deployment process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a cloud deployment process, such as cloud deployment process 10 of FIG. 1, may include but is not limited to, determining whether an availability zone of a plurality of availability zones is routable to an on-premises network. An intent associated with the deployment of a cloud-based storage system is processed. The cloud-based storage system is deployed in the availability zone based upon, at least in part, whether the availability zone is routable to an on-premises network and the intent associated with the deployment of the cloud-based storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
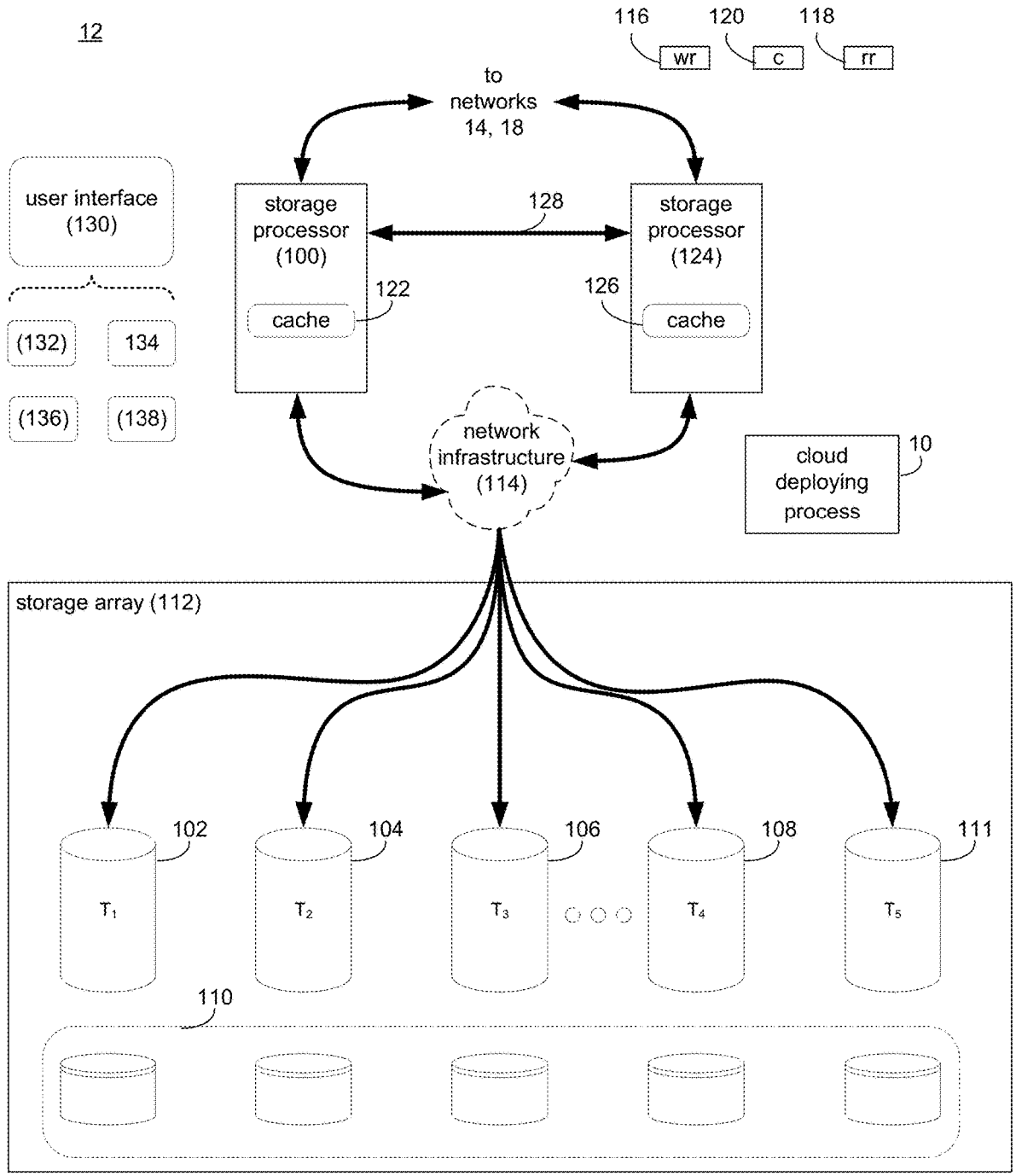
FIG. 2 is an example diagrammatic view of the storage system of FIG. 1 according to one or more example implementations of the disclosure.
Figure 3:
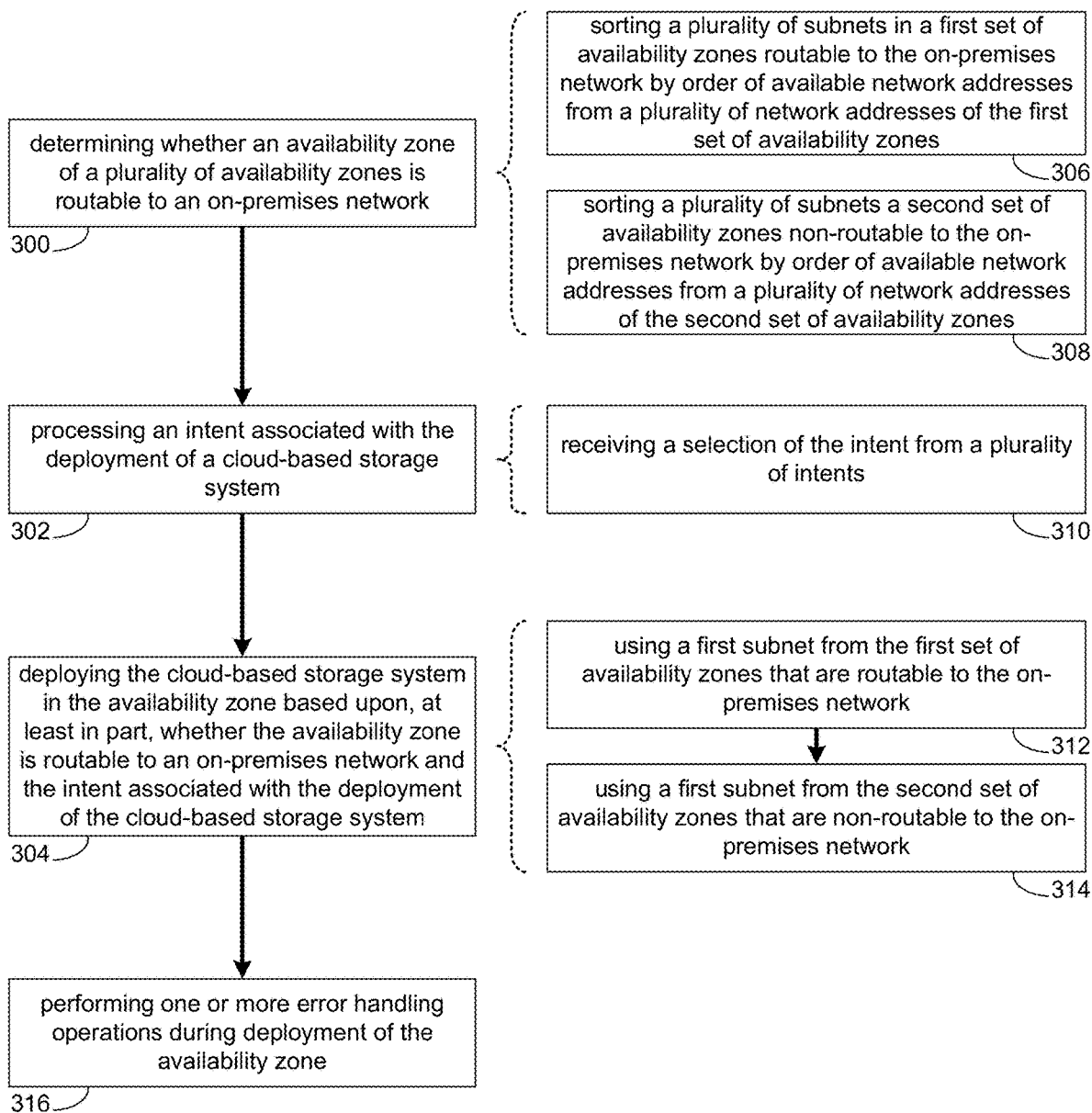
FIG. 3 is an example flowchart of cloud deployment process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of cloud deployment process 10. The instruction sets and subroutines of cloud deployment process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of cloud deployment process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of cloud deployment process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of cloud deployment process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from being overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of cloud deployment process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of cloud deployment process 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Cloud Deployment Process:

Referring also to the examples of FIGS. 3-8 and in some implementations, cloud deployment process 10 may determine 300 whether an availability zone of a plurality of availability zones is routable to an on-premises network. An intent associated with the deployment of a cloud-based storage system is processed 302. The cloud-based storage system is deployed 304 in the availability zone based upon, at least in part, whether the availability zone is routable to an on-premises network and the intent associated with the deployment of the cloud-based storage system.

As will be discussed in greater detail below, implementations of the present disclosure may allow for the dynamic configuration of a cloud-based storage system in a cloud computing environment using a user's intent and other storage system configurations. For example, portions of the storage system (e.g., storage system 12) may be deployed in a cloud computing environment. A cloud computing environment is a technological environment that provides cloud-based computing services over a set of hosted servers and applications, which are accessible over the internet or other network configuration. Examples of cloud-based computing services include applications and development platforms, to servers, storage, and virtual computing systems. Cloud-based computing services are provided by cloud computing providers (service providers) as a service over the internet. Their services include servers, virtual machines, applications, application development platforms, storage, databases, and/or networking. Users (individuals or entities) can subscribe to cloud computing services with varying pricing options to choose from. Examples of cloud service providers include, but are not limited to, Microsoft® Azure® from Microsoft Corporation in the United States, Amazon Web Services™ (AWS™) from Amazon.com, Inc., and Google Cloud Platform™ from Google LLC.

Figure 4:
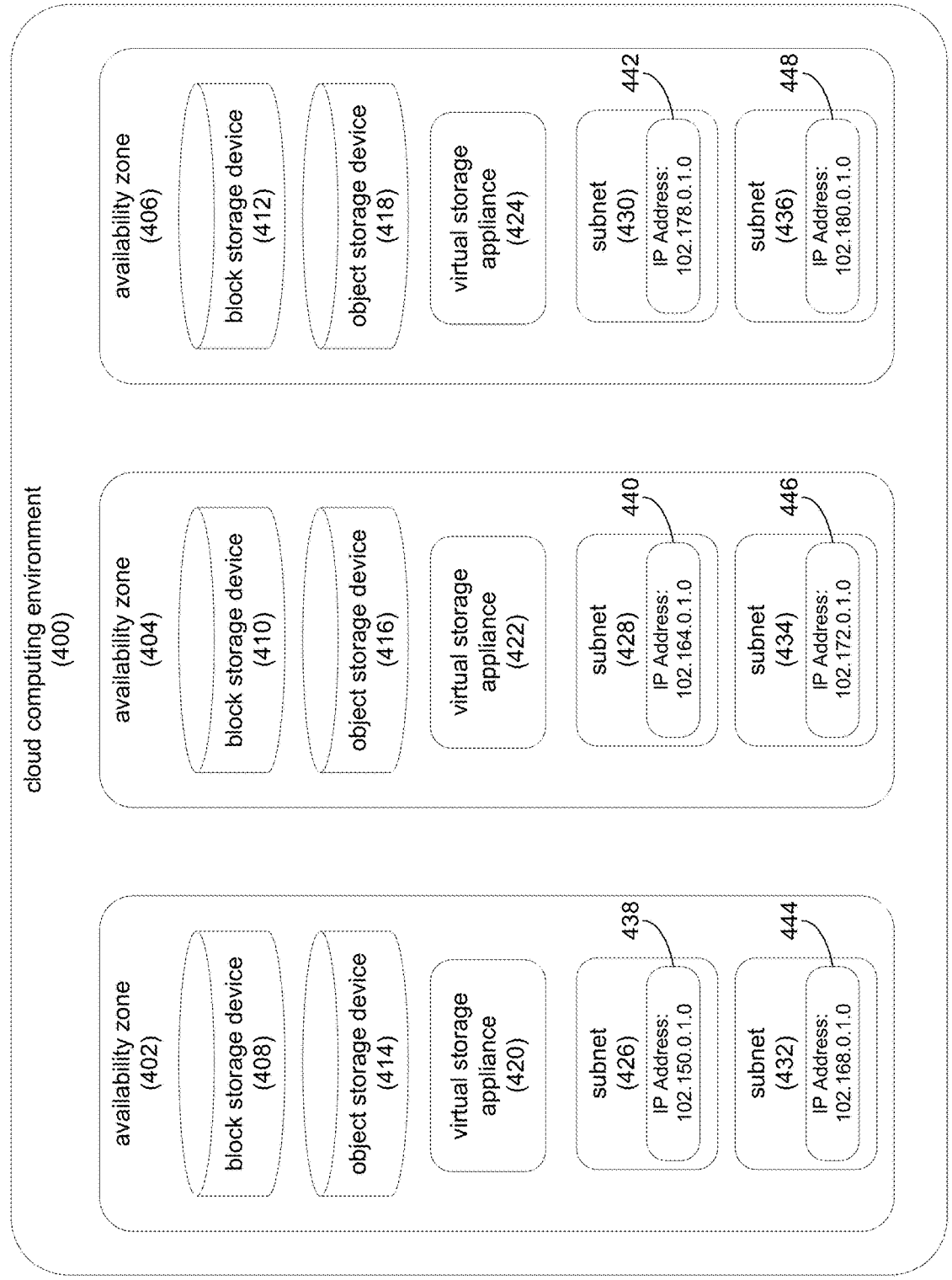
FIGS. 4-8 are example diagrammatic views of the storage system of FIG. 1 according to various example implementations of the disclosure.

Referring also to FIG. 4 and in some implementations, a cloud computing environment (e.g., cloud computing environment 400) may be configured to perform various cloud-based computing services. Cloud computing environment 400 may include various availability zones (e.g., availability zones 402, 404, 406). An availability zone is an isolated data center or storage system located within specific regions in which public cloud services originate and operate. Cloud service providers typically have multiple worldwide availability zones. This helps ensure cloud customers have a stable connection to a cloud service in the geographic zone that is closest to them and/or that meets their specific needs. Users typically use availability zones for a variety of reasons, including compliance and proximity to customers. Cloud administrators can also choose to replicate services across multiple availability zones to decrease latency or protect resources. Administrators can move resources to another availability zone in the event of an outage. Specific cloud services may also be limited to particular regions or availability zones. As such, it will be appreciated that the process of deploying a cloud-based storage system may be influenced by various factors and constraints. Accordingly, cloud deployment process 10 abstracts the underlying complexities and various factors of dynamically deploying a cloud-based storage system into an "intent" representative of a user's intention with the cloud-based storage system. In this manner, cloud deployment process 10 provides efficient cloud-based storage system configurations based on the intent of the user.

In some implementations, each availability zone (e.g., availability zones 402, 404, 406) may have access to or include various resources. For example, each availability zone (e.g., availability zones 402, 404, 406) may provide access to various storage resources (e.g., block storage devices 408, 410, 412; object storage devices 414, 416, 418; virtual storage appliances (VSAs) 420, 422, 424; and subnets 426, 428, 430, 432, 434, 436). In some implementations, a block storage device (e.g., block storage devices 408, 410, 412) is a storage device deployed within the cloud computing environment that is configured to store data in equally sized blocks. This system offers performance advantages over traditional storage, and generally boasts lower latency. However, a block storage device is a premier storage device and is typically the most expensive. In one example, the cloud-based block storage device is Amazon Elastic Block Storage.

In some implementations, cloud-based object storage is a storage service in public cloud resources that is cost efficient. Cloud-based object storage is well suited for static data and its agility and flat nature means it can scale to extremely large quantities of data. In some implementations, the cloud-based objects have sufficient information for an application to find the data quickly. Cloud-based object storage also supports HTTP protocol for data transfer and most clients support HTTP. In one example, availability zones 402, 404, 406 may each provide access to one or more cloud-based object storage devices (e.g., object storage devices 414, 416, 418). In one example, object storage device 414 is an Amazon S3 storage device.

Cloud computing environments use virtualization technology, which allows for the creation of simulated virtual computers that behave like physical computers. Such computers are called Virtual Machines (VM). Though multiple VMs can be created on one physical server, VMs typically work as isolated independent machines and their files and other resources are not visible to one other. Virtualization allows more efficient use of hardware resources by running multiple VMs in the same hardware and serving multiple users or user applications at the same time, which helps to reduce the cost of computing.

In some implementations, a virtual storage appliance (VSA) may be deployed in the cloud computing environment. A VSA is a set of virtual machines in the cloud computing environment with storage devices that typically store an operating system, applications, and data. In the example of FIG. 4, a VSA (e.g., VSAs 420, 422, 424) may be deployed within availability zones 402, 404, 406 of cloud computing environment 400. In one example, VSA 420 is a PowerStore™ virtual storage appliance available from Dell Technologies Inc. However, it will be appreciated that various VSAs may be used within the scope of the present disclosure.

In some implementations, each availability zone (e.g., availability zones 402, 404, 406) may include one or more subnets (e.g., subnets 426, 428, 430, 432, 434, 436). A subnet or subnetwork is a logical subdivision of an Internet Protocol (IP) network. Computing devices that belong to the same subnet are addressed with an identical most-significant bit-group in their IP addresses. This results in the logical division of an IP address into two fields: the network number or routing prefix and the rest field or host identifier. The rest field is an identifier for a specific host or network interface. In some implementations, each subnet may be routable to an on-premises network or may be non-routable to the on-premises network. For example, an on-premises network generally includes a local network with a storage system that is confined to the local network. In contrast to an on-premises network, a cloud network includes a storage system with resources external to an on-premises network. As such, a cloud network is accessible from any location using an Internet connection and the network address (e.g., IP address) specific to the cloud network. In some implementations, an availability zone (e.g., availability zones 402, 404, 406) may include one or more subnets that are routable to an on-premises network (e.g., a local network of storage system 12) and/or one or more subnets that are not routable (i.e., non-routable) to the on-premises network. Accordingly, cloud deployment process 10 may utilize various subnets of availability zone to deploy a cloud-based storage system depending upon, at least in part, whether or not the subnet (e.g., subnets 426, 428, 430, 432, 434, 436) is routable to an on-premises network.

In some implementations, cloud deployment process 10 determines 300 whether an availability zone of a plurality of availability zones is routable to an on-premises network. For example and as discussed above, each availability zone (e.g., availability zones 402, 404, 406) includes one or more subnets (e.g., subnets 426, 432 of availability zone 402; subnets 428, 434 of availability zone 404; and subnets 430, 436 of availability zone 406). In some implementations, each subnet may be defined to include access to an on-premises network (e.g., storage system 12) or may not be defined to include access to the on-premises network. Accordingly, cloud deployment process 10 may access each availability zone (e.g., availability zones 402, 404, 406) to determine 300 whether each subnet (e.g., subnets 426, 428, 430, 432, 434, 436) are routable to an on-premises network.

In some implementations, determining 300 whether an availability zone of the plurality of availability zones is routable to an on-premises network includes: sorting 306 a plurality of subnets in a first set of availability zones routable to the on-premises network by order of available network addresses from a plurality of network addresses of the first set of availability zones; and sorting 308 a plurality of subnets in a second set of availability zones non-routable to the on-premises network by order of available network addresses from a plurality of network addresses of the second set of availability zones. For example, suppose that a first set of availability zones (e.g., availability zones 402, 404, 406) include a plurality of subnets (e.g., subnets 426, 428, 430) that are routable to an on-premises network. In this example, cloud deployment process 10 sorts 306 each subnet (e.g., subnets 432, 434, 436) in the first set of availability zones by order of available network addresses (e.g., IP addresses 438, 440, 442).

Figure 5:
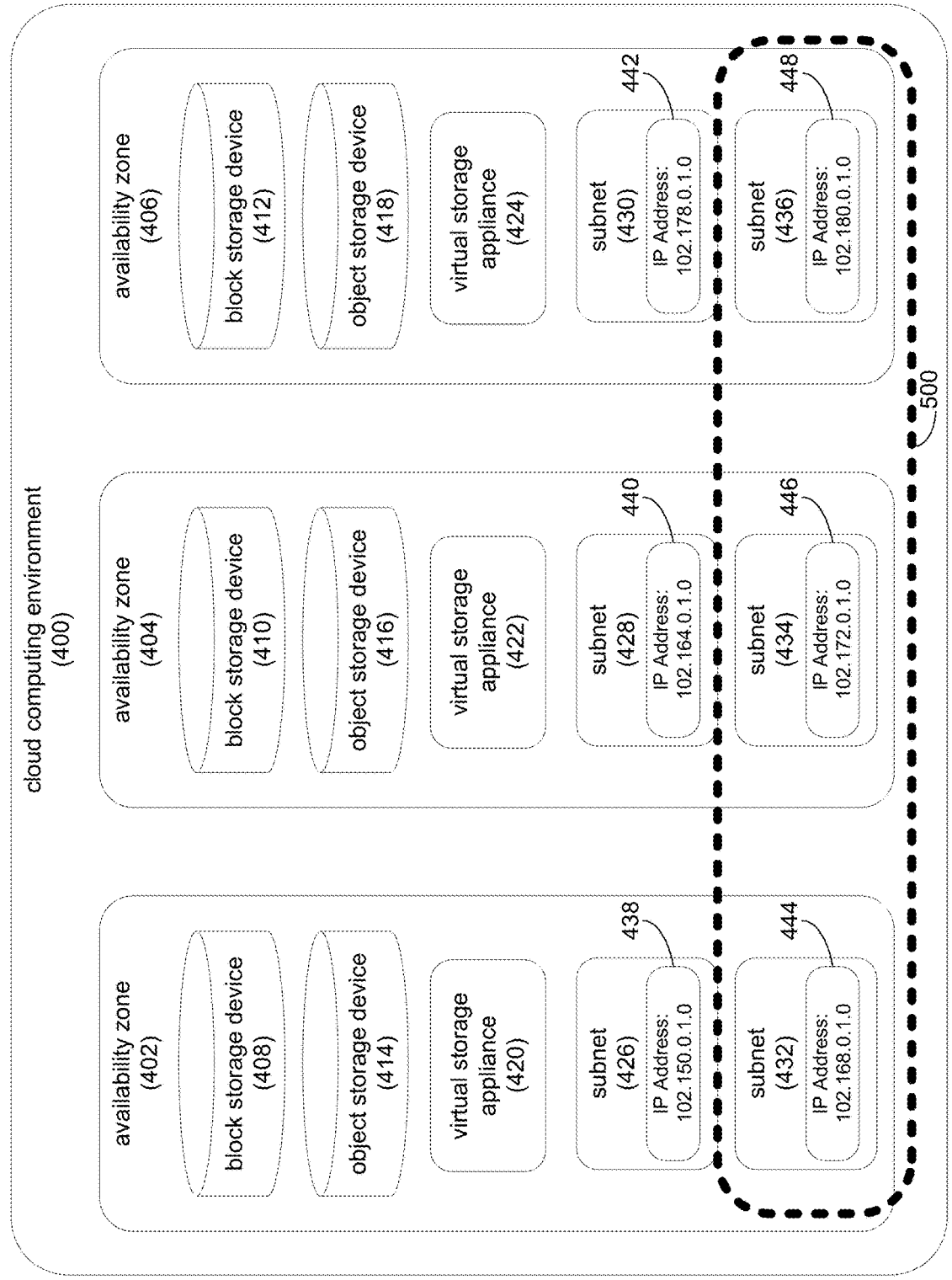

For example and referring also to FIG. 5, cloud deployment process 10 sorts a plurality of subnets (e.g., subnets 432, 434, 436) in a first set of availability zones that are routable to an on-premises network. In the example of FIG. 5, cloud deployment process 10 defines a sorted list of subnets (e.g., subnets 432, 434, 436) by order of available network addresses (IP addresses 444, 446, 448), where the sorted list is shown as the grouping in dashed lines around subnets 432, 434, 436 (e.g., sorted list 500). In some implementations, sorted list 500 may be defined as a stack where each subnet is added (i.e., "pushed") on the stack and removed (i.e., "popped") off the stack when deployed.

Figure 6:
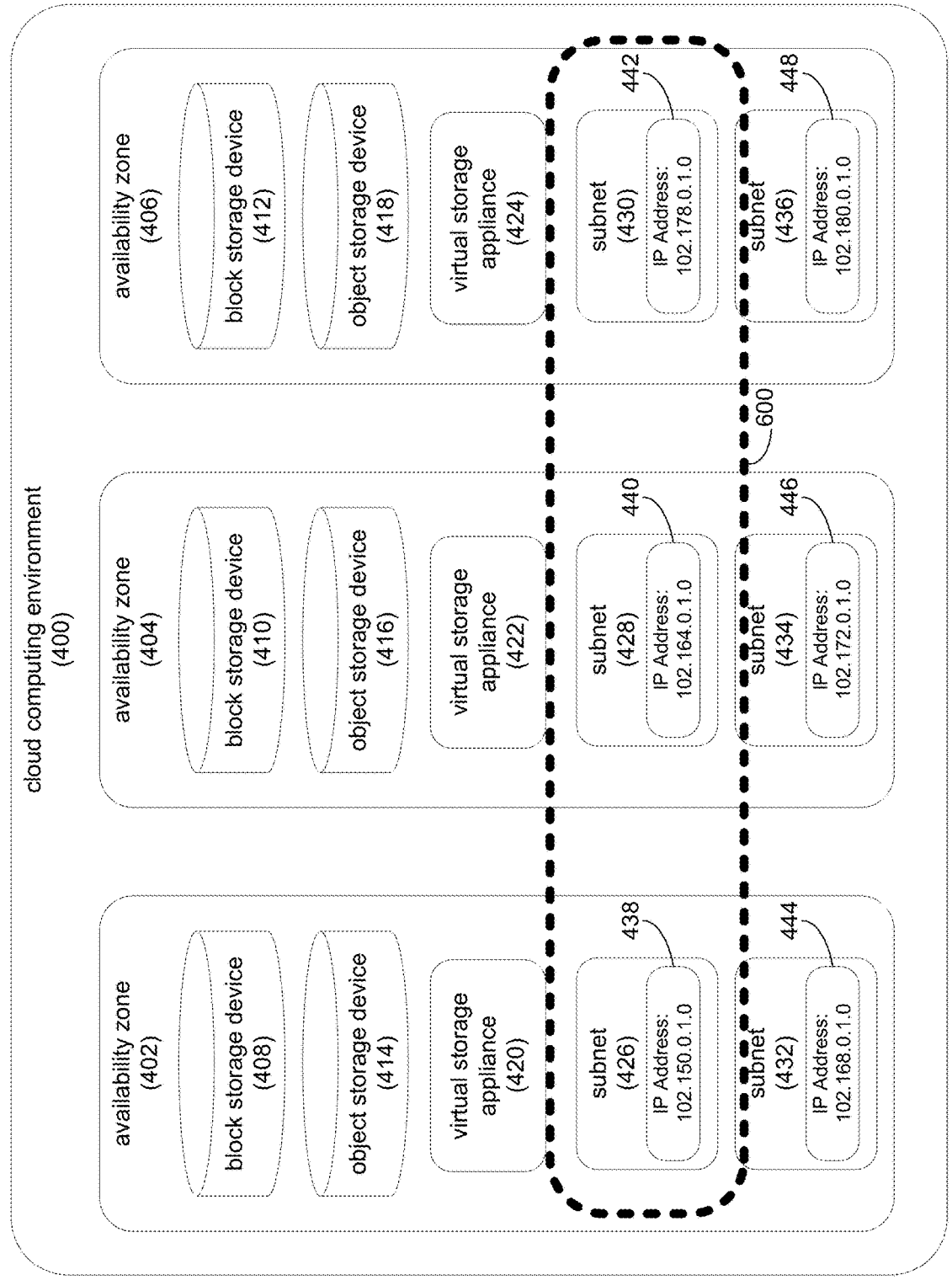

Referring also to FIG. 6, cloud deployment process 10 sorts a plurality of subnets (e.g., subnets 438, 440, 442) in a second set of availability zones that are non-routable to an on-premises network. In the example of FIG. 6, cloud deployment process 10 defines a sorted list of subnets (e.g., subnets 438, 440, 442) that are not routable to the on-premises network by order of available network addresses (IP addresses 444, 446, 448), where the sorted list is shown as the grouping in dashed lines around subnets 438, 440, 442 (e.g., sorted list 600). In some implementations, sorted list 600 may be defined as a stack where each subnet is added (i.e., "pushed") on the stack and removed (i.e., "popped") off the stack when deployed. With the combination of sorted lists 500, 600, cloud deployment process 10 determines 300 whether each availability zone is routable to an on-premises network.

In some implementations, cloud deployment process 10 processes 302 an intent associated with the deployment of a cloud-based storage system. An intent is a description or selection of an intended purpose, focus, or goal for the cloud-based storage system. For example and as discussed above, conventional approaches to deploying cloud-based storage systems includes various features and functionalities that are configured and optimized for particular purposes. However, many users are unable or do not desire to initially define all of the components of their cloud-based storage system. Further, as use of a cloud-based storage system changes over time (i.e., different workloads, expanding capacity, reducing capacity, etc.), users may be unable to effectively manage all of the components of their cloud-based storage system in a dynamic manner that accounts for new intentions. Accordingly, cloud deployment process 10 uses an intent associated with the deployment of the cloud-based storage system to deploy, or dynamically adjust the deployment of, the cloud-based storage system.

In some implementations, processing 302 the intent associated with the deployment of a cloud-based storage system includes receiving 310 a selection of the intent from a plurality of intents. For example, cloud deployment process 10 may provide a user interface (e.g., user interface 130 shown in FIG. 2) configured to receive 310 a selection of an intent from a plurality of intents. In one example, user interface 130 may provide options for particular parameters associated with the deployment of a cloud-based storage system. For example, the parameters may include types, numbers, and/or sizes of storage devices (e.g., cloud-based object storage devices, cloud-based block storage devices, VSAs, etc.). In some implementations, user interface 130 may include a menu of a plurality of intents from which a user may select a particular intent.

In some implementations, the plurality of intents include one or more of: a first intent configured to deploy a minimum set of resources in an availability zone; a second intent configured to deploy a set of resources for optimizing IO operations in an availability zone; a third intent configured to deploy a set of resources for data mobility in a cloud computing environment; and a fourth intent configured to deploy a set of resources for data mobility between the cloud computing environment and the on-premises network. For example, the first intent may include configuration information configured to deploy a minimum set of resources in an availability zone. In this manner, the first intent is focused on simply deploying a minimum set of resources to enable the operation of a cloud-based storage system. For example, with first intent (e.g., first intent 132), cloud deployment process 10 may reference a predefined selection of computing resources (e.g., block storage devices, object storage device, VSAs, etc.) to provide balance in cost versus performance and processing power and memory. As will be discussed in greater detail below, cloud deployment process 10 may dynamically reference one or more databases with deployment information associated with first intent 132.

In some implementations, the second intent may include configuration information configured to deploy a set of resources for optimizing IO operations in an availability zone. In this manner, the second intent is focused on achieving optimized processing of input/output (IO) operations in the cloud-based storage system. For example, with second intent (e.g., second intent 134), cloud deployment process 10 may reference a predefined selection of computing resources (e.g., block storage devices, object storage device, VSAs, etc.) to provide high performance processing of IO operations (e.g., by deploying high performance volumes, CPU resources, and memory). As will be discussed in greater detail below, cloud deployment process 10 may dynamically reference one or more databases with deployment information associated with second intent 134.

In some implementations, the third intent may include configuration information configured to deploy a set of resources for data mobility in a cloud computing environment. In this manner, the third intent is focused on deploying a standard set of resources, optimized CPU/memory and high-end volumes. The resulting cloud-based storage system is deployed in any availability zone and plugs to a cloud native network. The two endpoints of data mobility should have the same product type, and in the same availability zone. For example, with third intent (e.g., third intent 136), cloud deployment process 10 may reference a predefined selection of computing resources (e.g., block storage devices, object storage device, VSAs, etc.) to provide data mobility in the cloud computing environment (e.g., cloud computing environment 400). As will be discussed in greater detail below, cloud deployment process 10 may dynamically reference one or more databases with deployment information associated with third intent 136.

In some implementations, the fourth intent may include configuration information configured to deploy a set of resources for data mobility between the cloud computing environment and the on-premises network. For example, with fourth intent (e.g., fourth intent 138), cloud deployment process 10 may reference a predefined selection of computing resources (e.g., block storage devices, object storage device, VSAs, etc.) to provide a cloud-based storage system in an availability zone that has the most available addresses routable to on-premises network. In this example, a standard or optimized set of resources, optimized CPU/memory and high-end volumes may be configured. As will be discussed in greater detail below, cloud deployment process 10 may dynamically reference one or more databases with deployment information associated with fourth intent 138. While four example intents have been described above, it will be appreciated that these are for example purposes only and that any number of and type of intent may be selected from within the scope of the present disclosure.

In some implementations, cloud deployment process 10 deploys 304 the cloud-based storage system in the availability zone based upon, at least in part, whether the availability zone is routable to an on-premises network and the intent associated with the deployment of the cloud-based storage system. For example, with the selection of a particular intent and the organization of availability zones into sorted lists based upon on-premises connections/routing, cloud deployment process 10 dynamically deploys a cloud-based storage system with the particular resources and configurations to achieve the desired intent. Deploying the cloud-based storage system may generally include communicating with a cloud service provider to organize, provision, allocate, and couple various components within an availability zone for processing data using the cloud-based storage system. For example, cloud deployment process 10 uses the selected intent (e.g., first intent 132, second intent 134, third intent 136, fourth intent 138) and the sorted lists (e.g., sorted lists 500, 600) indicating whether an availability zone is routable to the on-premises network to configure a cloud-based storage system.

In some implementations, deploying 304 the cloud-based storage system in the availability zone based upon, at least in part, whether the availability zone is routable to an on-premises network and the intent associated with the deployment of the cloud-based storage system includes using 312 a first subnet from the first set of availability zones that are routable to the on-premises network. For example and as discussed above, cloud deployment process 10 may use the selected intent to determine which resources to deploy in a cloud-based storage system. In one example, suppose that a user desires a cloud-based storage system with data mobility between a cloud computing environment and on-premises network. Accordingly, cloud deployment process 10 determines the availability zone and the subnet of the availability zone that is routable to the on-premises network. Cloud deployment process 10 may "pop" the top or first subnet from the first set of availability zones that are routable to the on-premises network. With the first subnet from an availability zone that is routable to the on-premises network, cloud deployment process 10 deploys a cloud-based storage system that is routable to the on-premises network with the resources associated with that intent.

Figure 7:
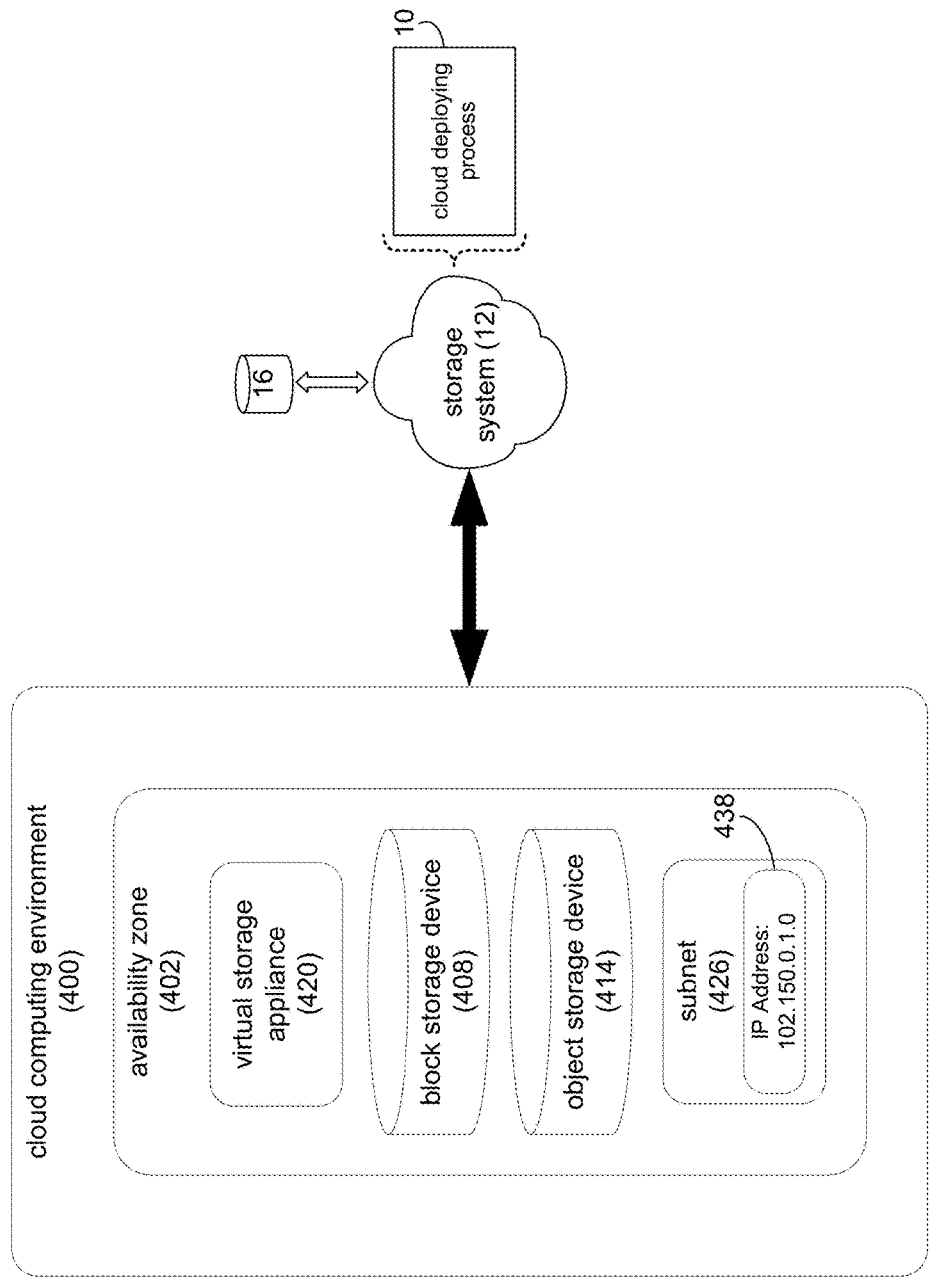

For example and referring also to FIG. 7, cloud deployment process 10 may deploy 304 the cloud-based storage system (e.g., cloud-based storage system 700) based upon, at least in part, determining whether the availability zone (e.g., availability zones 402, 404, 406) is routable to an on-premises network and the intent associated with the deployment of the cloud-based storage system. For example, suppose that cloud deployment process 10 determines 300 that availability zone 402 is routable to an on-premises network using subnet 426 with available network address: IP address 102.150.0.1.0. Further, suppose that cloud deployment process 10 processes 302 an intent (e.g., fourth intent 138) indicating an intent to route information between an on-premises network and a cloud computing environment. Accordingly, cloud deployment process 10 deploys cloud-based storage system 700 by determining which resources to deploy from availability zone 402. For example, cloud deployment process 10 selects particular block storage devices (e.g., block storage device 408), object storage devices (e.g., object storage device 414), and VSAs (e.g., VSA 420) for routing information between an on-premises network and a cloud computing environment.

In some implementations, deploying 304 the cloud-based storage system in the availability zone based upon, at least in part, whether the availability zone is routable to an on-premises network and the intent associated with the deployment of the cloud-based storage system includes using 314 a first subnet from the second set of availability zones that are non-routable to the on-premises network. For example and as discussed above, cloud deployment process 10 may use the selected intent to determine which resources to deploy in a cloud-based storage system. In one example, suppose that a user desires a cloud-based storage system that optimizes IO operation performance. Accordingly, cloud deployment process 10 determines the availability zone and the subnet of the availability zone that is not routable to the on-premises network. Cloud deployment process 10 may "pop" the top or first subnet from the second set of availability zones that are non-routable to the on-premises network. With the first subnet from an availability zone that is non-routable to the on-premises network, cloud deployment process 10 deploys a cloud-based storage system that is non-routable to the on-premises network with the resources associated with that intent.

Figure 8:
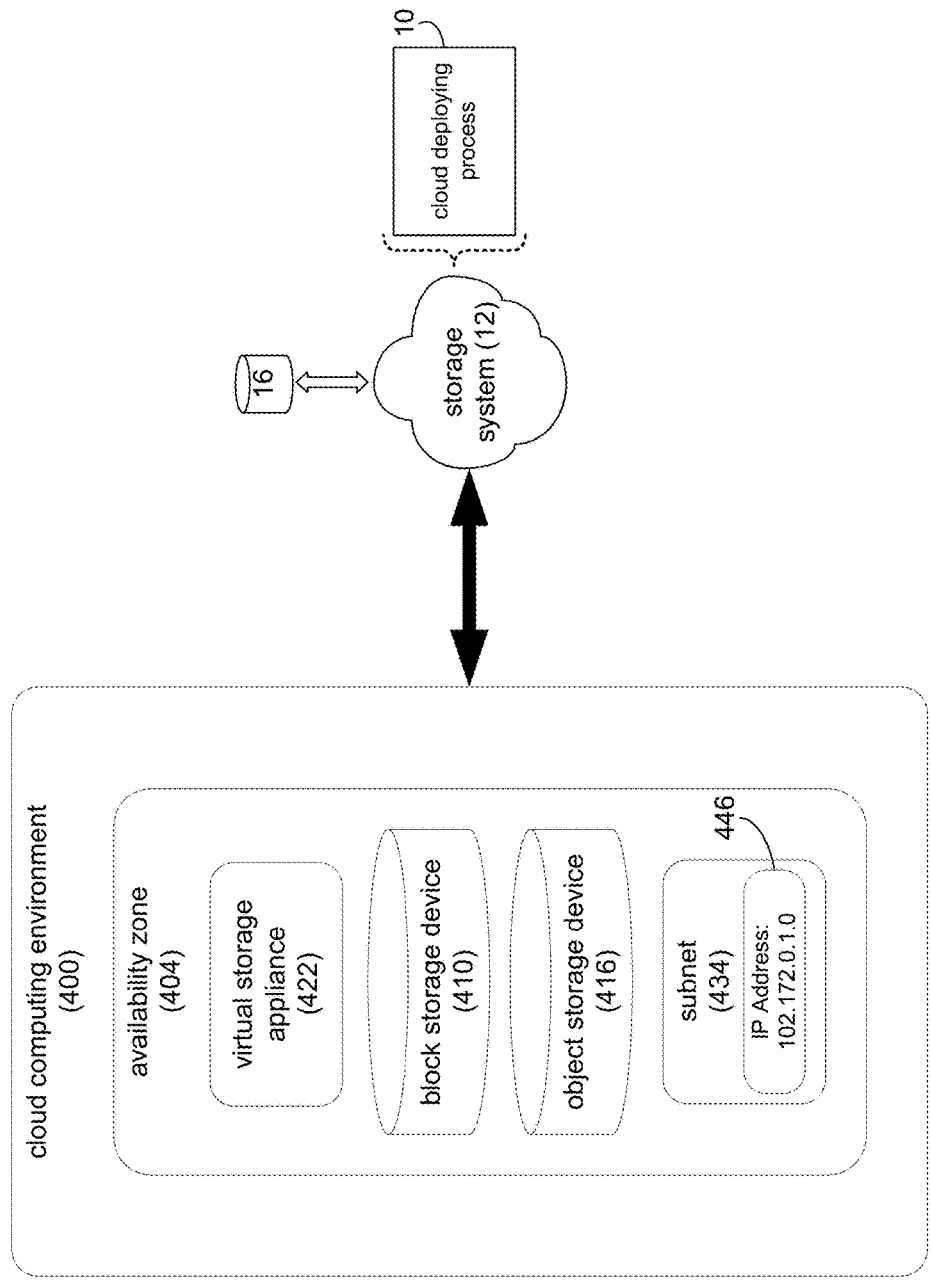

For example and referring also to FIG. 8, cloud deployment process 10 may deploy 304 the cloud-based storage system (e.g., cloud-based storage system 800) based upon, at least in part, determining whether the availability zone (e.g., availability zones 402, 404, 406) is routable to an on-premises network and the intent associated with the deployment of the cloud-based storage system. For example, suppose that cloud deployment process 10 determines 300 that availability zone 404 is non-routable to an on-premises network using subnet 434 with available network address: IP address 102.150.0.1.0. Further suppose that cloud deployment process 10 processes 302 an intent (e.g., second intent 134) indicating an intent to optimize IO operations in an availability zone. Accordingly, cloud deployment process 10 deploys 304 cloud-based storage system 800 by determining which resources to deploy from availability zone 404. For example, cloud deployment process 10 selects particular block storage devices (e.g., block storage device 410), object storage devices (e.g., object storage device 416), and VSAs (e.g., VSA 422) for optimizing IO operations in availability zone 404.

In some implementations, cloud deployment process 10 performs 316 one or more error handling operations during deployment of the availability zone. For example, error handling operations may be split into proactive and reactive error handling operations. In some implementations, cloud deployment process 10 may perform one or more proactive error handling operations. For example, cloud deployment process 10 may integrate with a public cloud health service in order to stop considering non-healthy regions and availability zones (with per-service granularity) until the issue is solved. In another example, cloud deployment process 10 may stop considering public cloud test and development accounts/subscriptions with too few remaining resources. In another example, cloud deployment process 10 may perform one or more reactive error handling operations. For example, cloud deployment process 10 may handle insufficient capacity errors and fallback to alternative resource types (e.g., fallback to alternative cloud instance type in case of lack of on-demand capacity for a primary one).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   determining whether an availability zone of a plurality of availability zones is routable to an on-premises network;
   processing an intent associated with a deployment of a cloud-based storage system; and
   deploying the cloud-based storage system in the availability zone based upon, at least in part, whether the availability zone is routable to the on-premises network and the intent associated with the deployment of the cloud-based storage system.

2. The computer-implemented method of claim 1, wherein determining whether an availability zone of the plurality of availability zones is routable to an on-premises network includes:
   sorting a plurality of subnets in a first set of availability zones routable to the on-premises network by order of available network addresses from a plurality of network addresses of the first set of availability zones; and
   sorting a plurality of subnets in a second set of availability zones non-routable to the on-premises network by order of available network addresses from a plurality of network addresses of the second set of availability zones.

3. The computer-implemented method of claim 2, wherein deploying the cloud-based storage system in the availability zone based upon, at least in part, whether the availability zone is routable to an on-premises network and the intent associated with the deployment of the cloud-based storage system includes using a first subnet from the first set of availability zones that are routable to the on-premises network.

4. The computer-implemented method of claim 2, wherein deploying the cloud-based storage system in the availability zone based upon, at least in part, whether the availability zone is routable to an on-premises network and the intent associated with the deployment of the cloud-based storage system includes using a first subnet from the second set of availability zones that are non-routable to the on-premises network.

5. The computer-implemented method of claim 1, wherein processing the intent associated with the deployment of a cloud-based storage system includes receiving a selection of the intent from a plurality of intents.

6. The computer-implemented method of claim 5, wherein the plurality of intents include one or more of:
a first intent configured to deploy a minimum set of resources in an availability zone;
a second intent configured to deploy a set of resources for optimizing input/output (IO) operations in an availability zone;
a third intent configured to deploy a set of resources for data mobility in a cloud computing environment; and
a fourth intent configured to deploy a set of resources for data mobility between the cloud computing environment and the on-premises network.

7. The computer-implemented method of claim 1, further comprising:
performing one or more error handling operations during deployment of the availability zone.

8. A computer program product residing on a non-transitory computer readable medium having a plurality of instructions stored thereon which, when executed by a processor, cause the processor to perform operations comprising:
determining whether an availability zone of a plurality of availability zones is routable to an on-premises network;
processing an intent associated with a deployment of a cloud-based storage system; and
deploying the cloud-based storage system in the availability zone based upon, at least in part, whether the availability zone is routable to the on-premises network and the intent associated with the deployment of the cloud-based storage system.

9. The computer program product of claim 8, wherein determining whether an availability zone of the plurality of availability zones is routable to an on-premises network includes:
sorting a plurality of subnets in a first set of availability zones routable to the on-premises network by order of available network addresses from a plurality of network addresses of the first set of availability zones; and
sorting a plurality of subnets in a second set of availability zones non-routable to the on-premises network by order of available network addresses from a plurality of network addresses of the second set of availability zones.

10. The computer program product of claim 9, wherein deploying the cloud-based storage system in the availability zone based upon, at least in part, whether the availability zone is routable to an on-premises network and the intent associated with the deployment of the cloud-based storage system includes using a first subnet from the first set of availability zones that are routable to the on-premises network.

11. The computer program product of claim 9, wherein deploying the cloud-based storage system in the availability zone based upon, at least in part, whether the availability zone is routable to an on-premises network and the intent associated with the deployment of the cloud-based storage system includes using a first subnet from the second set of availability zones that are non-routable to the on-premises network.

12. The computer program product of claim 8, wherein processing the intent associated with the deployment of a cloud-based storage system includes receiving a selection of the intent from a plurality of intents.

13. The computer program product of claim 12, wherein the plurality of intents include one or more of:
a first intent configured to deploy a minimum set of resources in an availability zone;
a second intent configured to deploy a set of resources for optimizing IO operations in an availability zone;
a third intent configured to deploy a set of resources for data mobility in a cloud computing environment; and
a fourth intent configured to deploy a set of resources for data mobility between the cloud computing environment and the on-premises network.

14. The computer program product of claim 8, wherein the operations further comprise:
performing one or more error handling operations during deployment of the availability zone.

15. A computing system comprising:
a memory; and
a processor configured to determine whether an availability zone of a plurality of availability zones is routable to an on-premises network, wherein the processor is further configured to process an intent associated with a deployment of a cloud-based storage system, and wherein the processor is further configured to deploy the cloud-based storage system in the availability zone based upon, at least in part, whether the availability zone is routable to the on-premises network and the intent associated with the deployment of the cloud-based storage system.

16. The computing system of claim 15, wherein determining whether an availability zone of the plurality of availability zones is routable to an on-premises network includes:
sorting a plurality of subnets in a first set of availability zones routable to the on-premises network by order of available network addresses from a plurality of network addresses of the first set of availability zones; and
sorting a plurality of subnets in a second set of availability zones non-routable to the on-premises network by order of available network addresses from a plurality of network addresses of the second set of availability zones.

17. The computing system of claim 16, wherein deploying a cloud-based storage system in the availability zone based upon, at least in part, whether the availability zone is routable to an on-premises network and the intent associated with the deployment of the cloud-based storage system includes using a first subnet from the first set of availability zones that are routable to the on-premises network.

18. The computing system of claim 16, wherein deploying a cloud-based storage system in the availability zone based upon, at least in part, whether the availability zone is routable to an on-premises network and the intent associated with the deployment of the cloud-based storage system includes using a first subnet from the second set of availability zones that are non-routable to the on-premises network.

19. The computing system of claim 15, wherein processing the intent associated with the deployment of the cloud-based storage system includes receiving a selection of the intent from a plurality of intents.

20. The computing system of claim 19, wherein the plurality of intents include one or more of:
- a first intent configured to deploy a minimum set of resources in an availability zone;
- a second intent configured to deploy a set of resources for optimizing IO operations in an availability zone;
- a third intent configured to deploy a set of resources for data mobility in a cloud computing environment; and
- a fourth intent configured to deploy a set of resources for data mobility between the cloud computing environment and the on-premises network.

* * * * *